(12) United States Patent
Baxter (10) Patent No.: US 9,093,868 B2
(45) Date of Patent: Jul. 28, 2015

(54) AIRFLOW MANAGEMENT

(71) Applicant: Robert Bosch GmbH, Stuttgart (DE)

(72) Inventor: Richard Baxter, Stowmarket (GB)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/867,286

(22) Filed: Apr. 22, 2013

(65) Prior Publication Data

US 2013/0278093 A1 Oct. 24, 2013

(30) Foreign Application Priority Data

Apr. 24, 2012 (EP) .................................. 12165383

(51) Int. Cl.
*H02K 9/06* (2006.01)
*A01D 34/00* (2006.01)
*A01D 69/02* (2006.01)

(52) U.S. Cl.
CPC ................ *H02K 9/06* (2013.01); *A01D 34/008* (2013.01); *A01D 69/02* (2013.01)

(58) Field of Classification Search
USPC ............... 310/52, 59, 62–63, 89, 71; 56/10.1, 56/11.9, 12.8
See application file for complete search history.

(56) References Cited

U.S. PATENT DOCUMENTS

| | | | | |
|---|---|---|---|---|
| 3,641,749 A | * | 2/1972 | Dwyer et al. | 56/17.5 |
| 4,244,164 A | * | 1/1981 | Szymanis | 56/202 |
| 4,446,681 A | * | 5/1984 | Dynie et al. | 56/16.7 |
| 4,773,205 A | * | 9/1988 | Hansen et al. | 56/13.3 |
| 5,113,642 A | * | 5/1992 | Dunn | 56/12.8 |
| 5,204,814 A | * | 4/1993 | Noonan et al. | 701/25 |
| 5,317,860 A | * | 6/1994 | Dunn | 56/12.8 |
| 5,323,593 A | * | 6/1994 | Cline et al. | 56/10.2 A |
| 8,191,343 B1 | * | 6/2012 | Hauser et al. | 56/11.9 |
| 2002/0156556 A1 | | 10/2002 | Ruffner | |
| 2013/0291506 A1 | * | 11/2013 | Johnson et al. | 56/12.8 |

FOREIGN PATENT DOCUMENTS

| | | |
|---|---|---|
| EP | 1 285 570 A1 | 2/2003 |
| EP | 1 925 197 A1 | 5/2008 |
| WO | 2008/015479 A2 | 2/2008 |

* cited by examiner

*Primary Examiner* — Thanh Lam
(74) *Attorney, Agent, or Firm* — Maginot, Moore & Beck LLP (57) ABSTRACT

The present disclosure relates to an airflow management system, particularly for a lawn mower, especially a robotic lawn mower. A battery-operated robotic lawn mower has an active airflow management system that includes at least one first air vent positioned on an underside of the mower, at least one second air vent, an internal housing surrounding a motor, a fan, and at least one cooling air channel located within the housing and around said motor. An air flow path is defined between the first and the second vents, and the at least one second vent has a lower air flow capacity than an air flow capacity of the at least one cooling air channel such that, in operation, a greater volume of air is drawn through the first vent than the second.

11 Claims, 7 Drawing Sheets

AIRFLOW MANAGEMENT

This application claims priority under 35 U.S.C. §119 to patent application no. EP 12165383.6-2119, filed on Apr. 24, 2012 with the European Patent Office, the disclosure of which is incorporated herein by reference in its entirety.

The present disclosure relates to an airflow management system, particularly for a lawn mower, especially a robotic lawn mower (also known as a self-guided or autonomous mowers).

BACKGROUND

Existing lawnmower designs can easily lead to overheating of the electrical components, as a result of high cutting loads, high ambient temperatures or a combination of both. Overheating can affect both the electronics and the batteries, particularly Lithium-ion batteries. This is particularly true for robotic lawn mowers. They will typically will be out in the sun most or all of the time especially when they are coupled to a docking station either having the batteries recharged or simply waiting for their next scheduled cutting operation. Using Lithium-ion batteries, the electronics in these devices are typically configured to prevent the product operating if the cells are above a certain limit temperature (usually 70° C.) to prevent permanent damage or, in extreme cases catching fire. There is therefore a need for additional cooling steps for these devices, particularly to prevent them from simply not operating in hot climates. Robotic devices typically have an outer shell, which is used in collision detection. This outer shell will provide some shading effect against ambient high temperatures, but will also mean that venting is required to allow air cooling of the device. Some cooling effect will be provided by the fan effect of rotating blades. However, this will be insufficient due to the low power provided to the cutting blades in such mowers. Attention also needs to be paid to the cooling of the device when it is not in operation.

Cooling fans have not been used in previous designs for battery operated robotic lawn mowers, because of the additional power requirements of the fan in operation. However, it will be shown that careful design and placement of vents in combination with a fan or impeller allow advantages in both cooling and debris removal.

SUMMARY

The current disclosure seeks to provide an airflow management system to enable more powerful cutting and longer duration of cutting regardless of cutting system height.

Accordingly, in its broadest sense, the present disclosure provides a battery operated robotic lawn mower with an active airflow management system, wherein the airflow management system comprises at least one first air vent positioned on an underside of the mower and at least one second air vent, an internal housing surrounding a prime mover, a fan or impeller, and at least one cooling air channel, the at least one second vent having a lower air flow capacity less than an air flow capacity of the at least one cooling air channel, such that, in operation of the motor, a greater volume of air is drawn from the first vent than the second vent and wherein an airflow path is defined between the first and the second vents.

Preferably the lawn mower further comprises an enveloping outer shell, to define an insulating layer between said mower and ambient atmospheric conditions.

Preferably when said mower is in operation, said fan provides a downward flow of air around said motor.

Preferably said at least one first air vent is positioned on the underside and behind a cutting area of said mower.

Preferably the lawn mower further comprises a barrier, located between said cutting area and said at least one first air vent, said barrier extending downwardly from and substantially across the width of, said underside.

Preferably the barrier is substantially in contact with grass at the highest cut level.

Preferably the barrier is substantially 50 mm deep in the direction of travel of said mower.

Preferably said at least one second vent is positioned in an opposing side of said mower, to enable convection cooling of the mower when the motor is not in operation.

Preferably the at least one second vent is located under the outer shell.

Preferably the first vent has substantially the same dimensions as the battery.

Preferably the first vent is at least substantially 40 mm above a height of grass at a highest cut level.

BRIEF DESCRIPTION OF THE DRAWINGS

The above and other aspects of the disclosure will now be described in further detail, by way of example only, with reference to the accompanying drawings in which.

DETAILED DESCRIPTION

Figure 1:
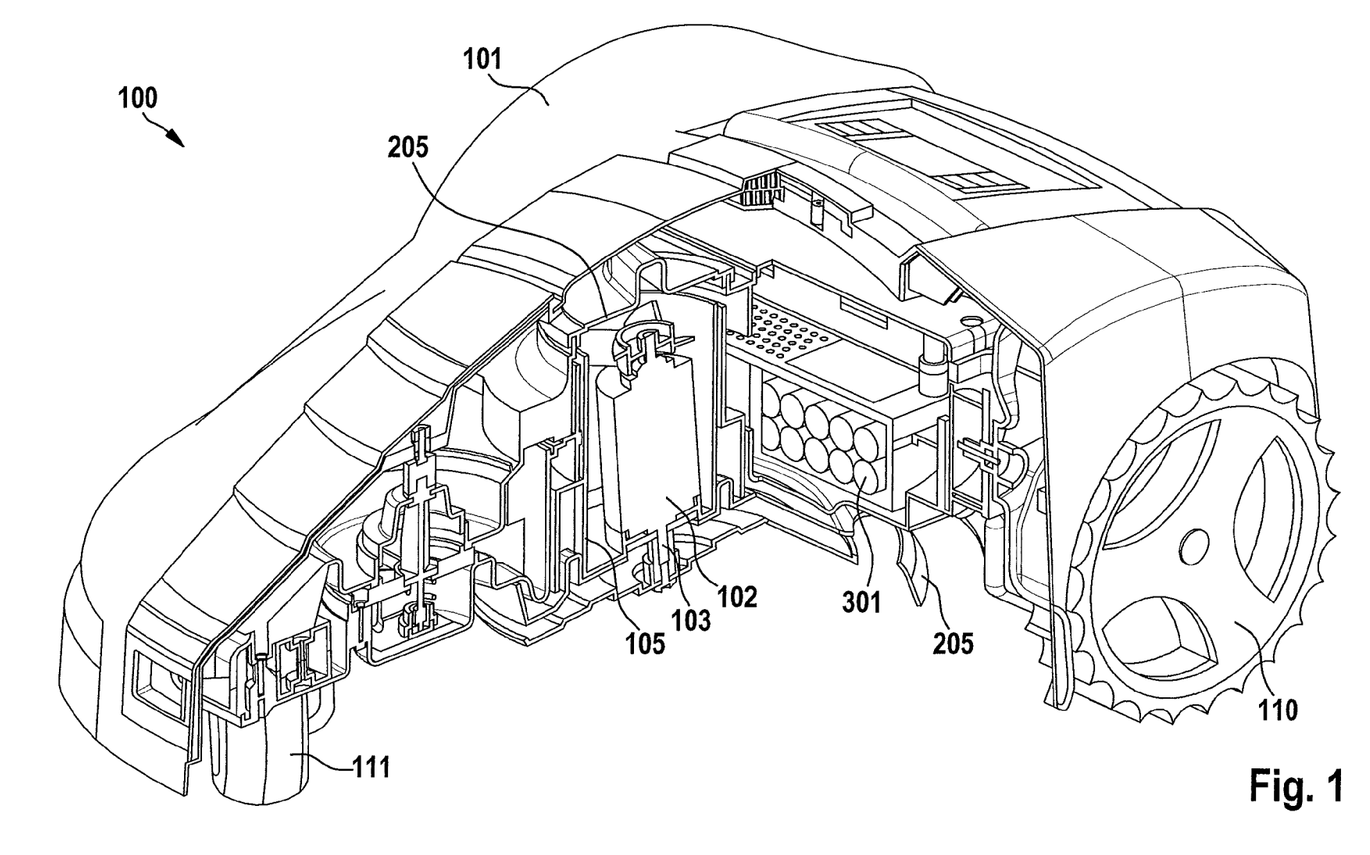
FIG. 1 is a cut-away sectional perspective view of a lawn mower with an airflow management system according to an embodiment of the present disclosure.

FIG. 1 illustrates a lawn mower 100, with an outer shell section 101, a drive motor 102 for driving a shaft 103 for attachment to a cutting disc 205 and a pinion 104 for driving a cooling fan 201. A housing section 105, with vents (not shown), houses the motor and the cooling fan and form part of a chassis for the mower, providing a mounting point for the other components of the mower, such as wheels 110, 111, battery packs 301 and control electronics.

In the illustrated embodiment, the front section of the mower is substantially sealed to avoid moisture ingress, as there are no components which require cooling in this section. The rear section is vented in selected places to allow cooling during operation. This will be discussed in greater detail below. Venting is also provided at the top of the mower. The vents are underneath the outer shell, so as to protect the mower from weather ingress. In the described embodiment, a screen meshed vent is provided for the rear vents to protect the electronics from moisture ingress.

Figure 2:
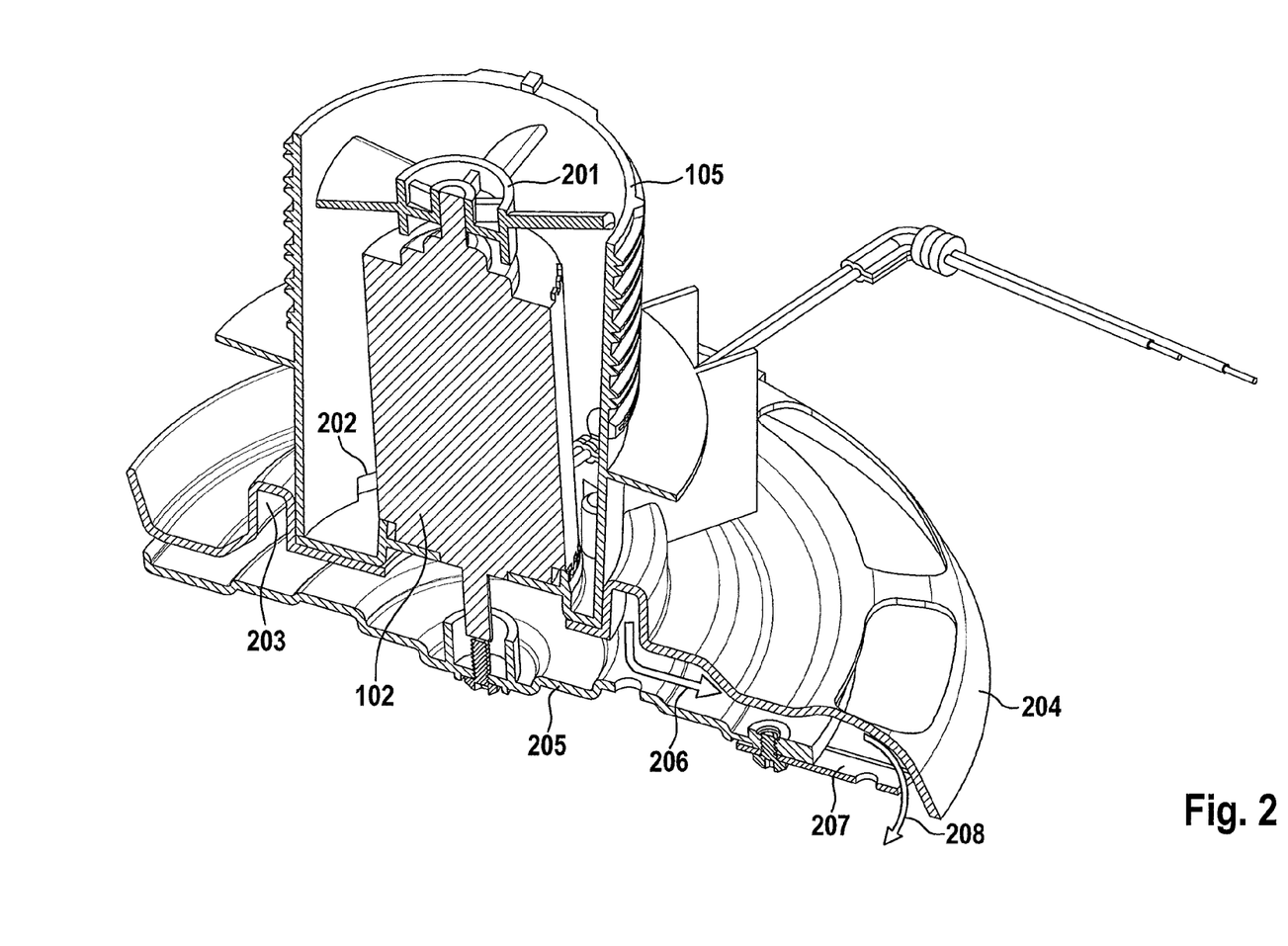
FIG. 2 is a section through a fan and vent arrangement of the lawn mower of FIG. 1.

FIG. 2 illustrates a cut away section through the housing 105, showing the cooling fan 201 and motor 102. Also illustrated is a mechanism for channeling a downward cooling airstream so as to use it to remove grass cuttings and other debris. After the air stream has passed the motor, it is expelled from the housing section via vents in the lower part of the housing 202 (one shown). The air is forced into an annular channel section 203 and thence it is guided between a cutting bowl 204 and the cutting disc 205. The direction of the air stream is indicated by arrow 206. The radial air flow between the cutting bowl and the cutting disc has the effect of removing cuttings and other debris from these surfaces and from the blades 207. The final stage is the downward deflection of air 208, which assists in preventing the machine drawing in freshly cut debris and contributes to the mulching process by driving fine grass cuttings into the lawn.

Figure 3:
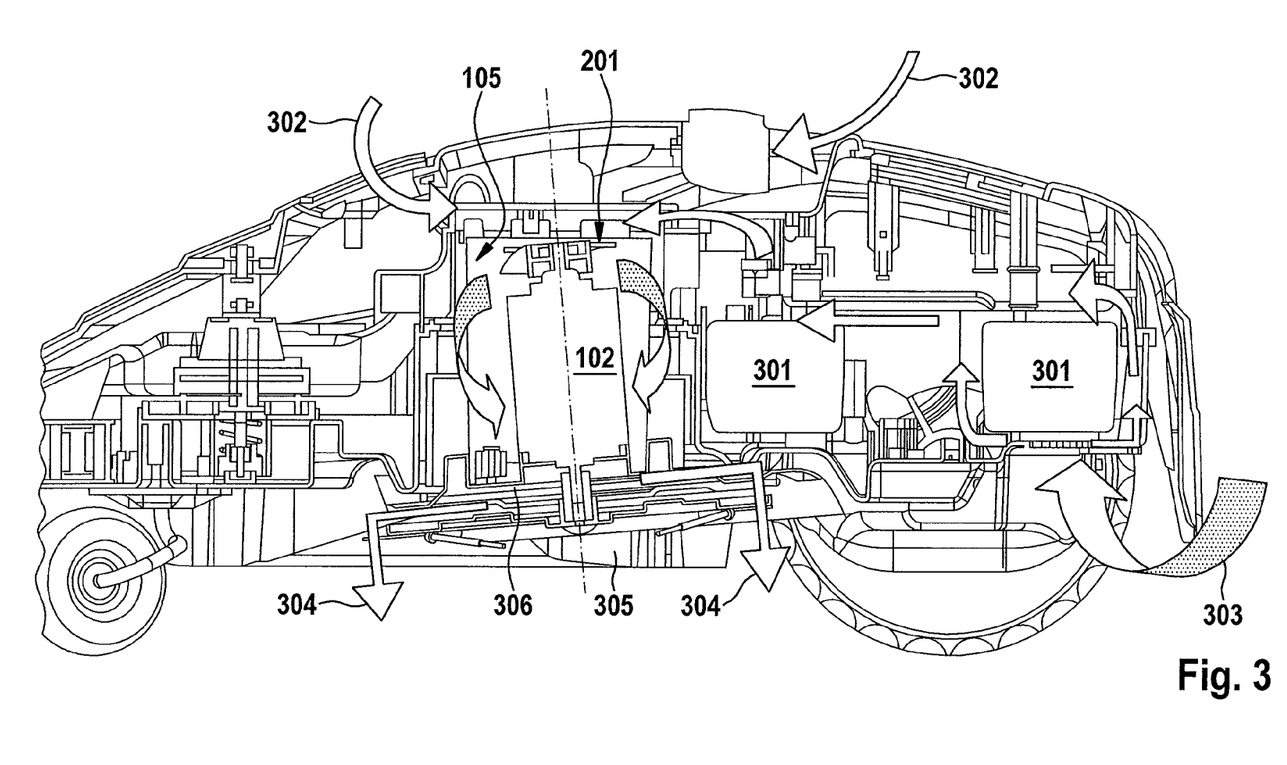
FIG. 3 is a longitudinal cross section of the lawn mower of FIG. 1.
Figure 4:
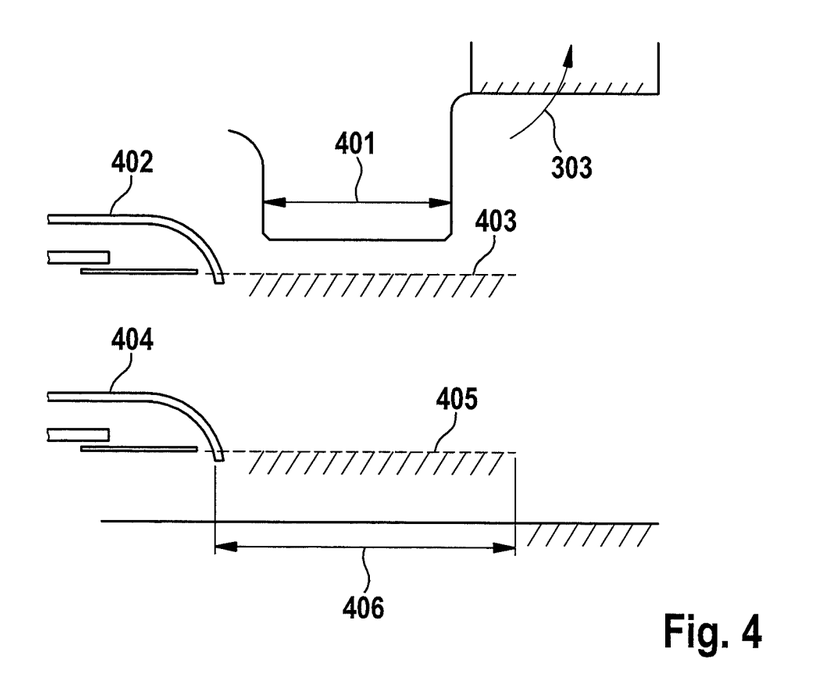
FIG. 4 is a schematic cross-sectional view through the rear of the lawn mower of FIG. 1, illustrating height of cut positions and the position of the first air vent.

FIG. 3 is a longitudinal section through the lawn mower of FIG. 1, showing airflow through the device. The fan 201 is arranged to draw air in from near the top of the housing 105 and force the air down past the motor 102. In addition to the cooling effect on the motor 102, the air flow has two additional roles; firstly, air is drawn by the action of the fan through the top and rear of the outer shell of the mower, thus cooling the batteries 301 and the electronics. Air flow 302 from the top of the device and air 303 from the rear is drawn by the fan through vents in the housing 105. Secondly, an exhaust air flow 304 is created, which passes between a cutting disc 305 and a cutter guard 306. The air is then deflected downwards by the sides of the cutter guard. The air vent 303 is positioned on the underside of the mower and towards the rear. The positioning of the vents on the underside of the device is to provide as much resistance to water ingress as possible in the event of rain or power washing of the mower. However, the positioning of the vents on the underside, behind the grass cutting areas, means that protection against grass cuttings is required. In damp conditions, cut but still wet grass falls under its own weight, however, vent 303 is positioned sufficiently high above the ground to prevent moisture from such grass entering the mower interior via the vent. In the preferred embodiment the inlet air vent is positioned at least 40 mm, preferably 50 mm above the highest height of the cut grass. At shorter grass cut height settings this value will increase to as much as 90 mm. In a preferred embodiment, a variable height setting is provided for the cutting system. A barrier is provided substantially across the width of the mower between the cutting blades and the inlet air vent. This is illustrated in FIG. 4, which shows the barrier 401, air vent 303, the longest cut setting of the blades 402 with corresponding grass height 403 and shortest cut setting of the blades 404 with corresponding grass height 405. A distance 406 of substantially 80 mm is provided between the rear side of the barrier and the blades in a preferred embodiment.

The barrier is such as to almost contact the cut grass at its longest cut setting and is about 50 mm wide in the direction of travel. This means that in dry conditions which could produce many light weight grass fragments in the air the barrier ensures that when on the highest cut setting such debris is substantially prevented from accessing the inlet vent. When on lower cut settings the whole underside is open as the cut grass level is then typically 40 mm lower and such airborne debris is able to vent away naturally. In wet conditions even on the highest cut setting the inlet vent is sufficiently above both cut grass and barrier level that water droplets thrown from wet grass debris will be unable to reach it. The air flow capacity of the upper vents should be significantly less than the air flow capacity through the housing in order to ensure that sufficient air is drawn through the underside vent.

The use of a mesh with large numbers of small holes may be used to help prevent grass cuttings and bugs entering the vents.

When the machine is not in operation, with the fan inactive, the vents allow convection cooling of the component of the mower. The design of the vents allows the entry of cool air into the rear of the mower and the exit of warmer air via the upper vents. The overall area of the underside vent typically substantially matches the area of the battery or batteries, which are typically mounted above the vent, such that convection or forced air flows are encouraged to flow around the sides and through the battery packs.

The exhaust air flow 304 combines four separate functions, cooling the motor, batteries and electronics as described above, drying the internal areas of the mower so as to deal with moisture ingress, removal of debris from the cutter and cutter guard, and assistance in the mulching process. The last two processes are assisted by the provision of a cutter guard with a deflector style design.

Figure 5:
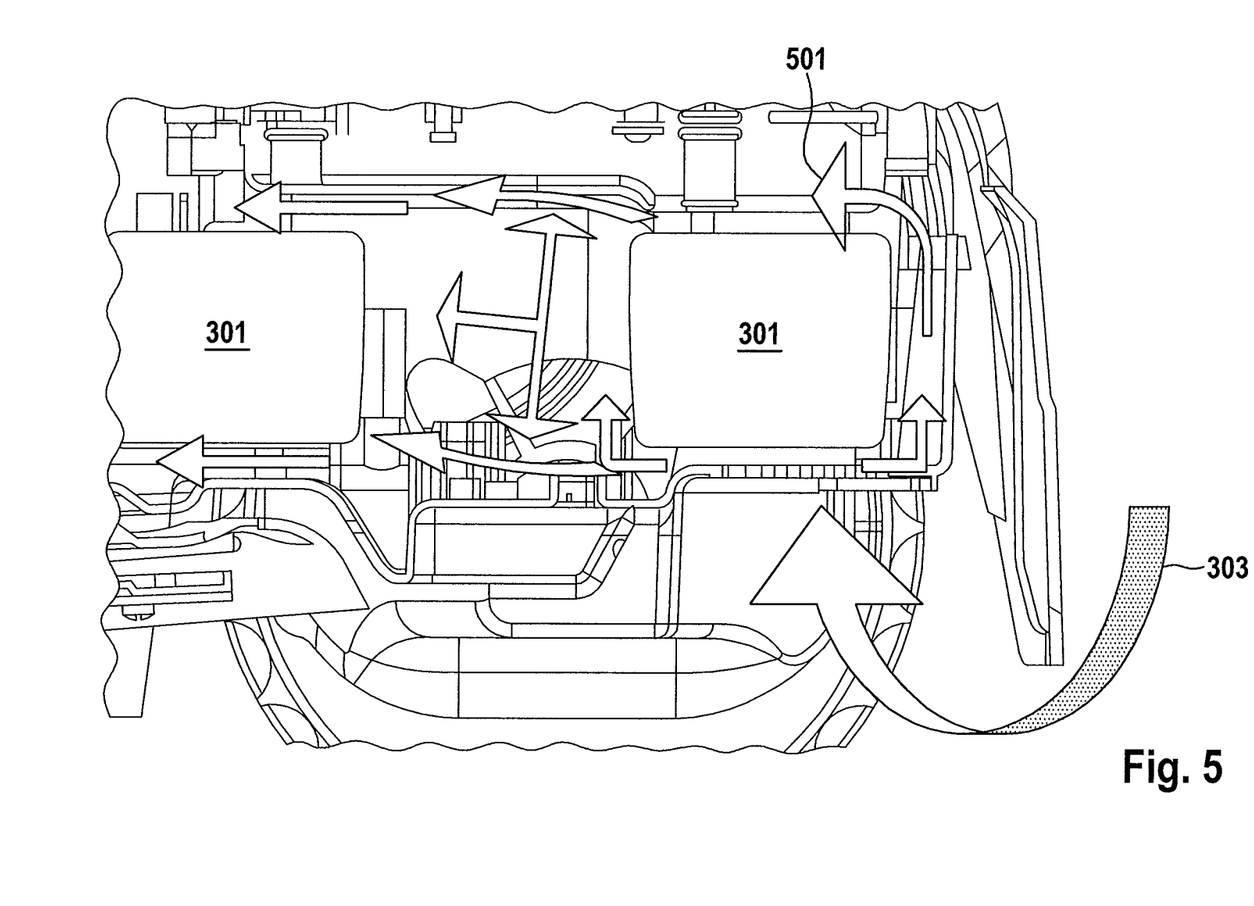
FIG. 5 is a detail of FIG. 3 illustrating air flow through the rear section of the mower.

FIG. 5 illustrates in more detail the air flow through the rear section of the mower according to an embodiment of the disclosure. Air 303 enters through the rear of the device and circulates 501 between components, including batteries 301 and electronics. The air flow both cools active devices and dries up any moisture ingress which may be damaging to the operation of the mower.

Figure 6:
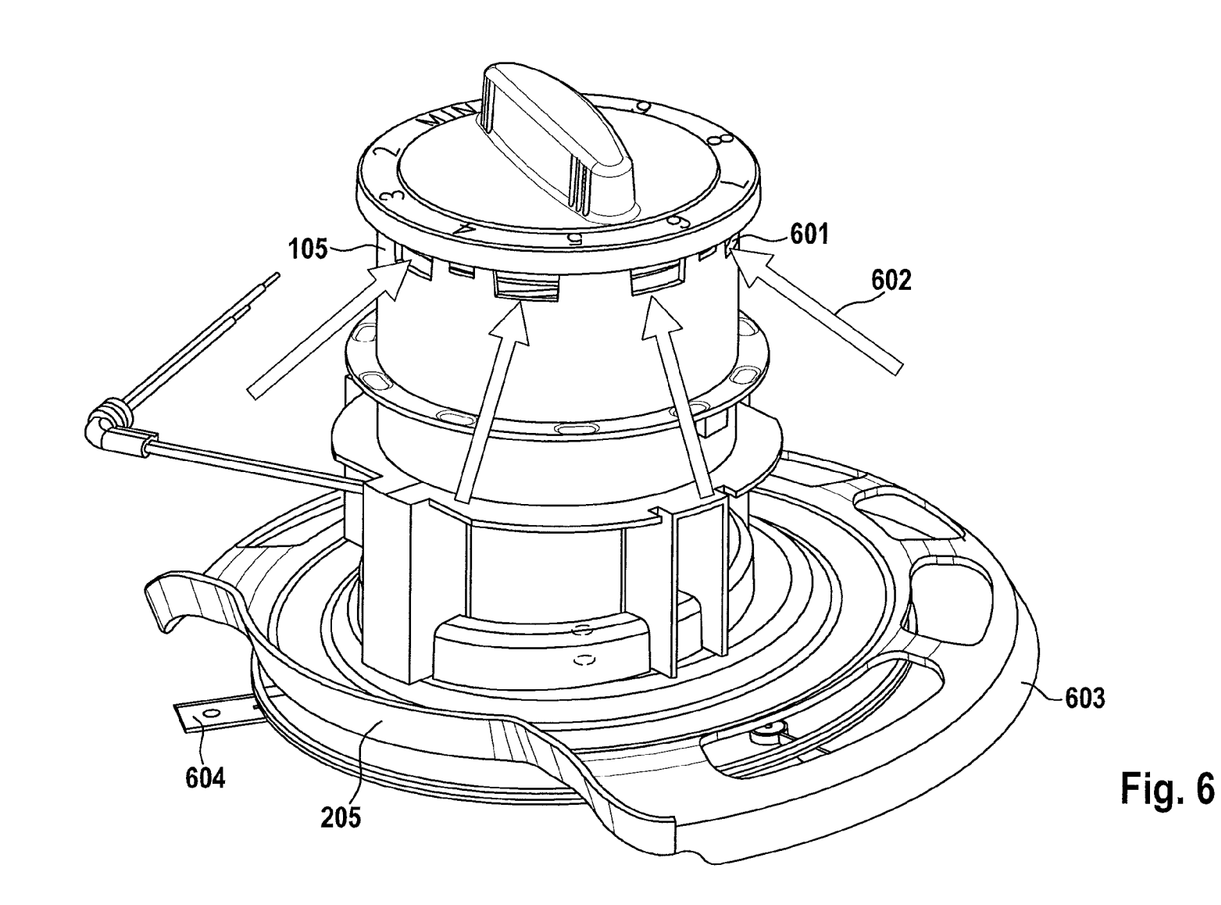
FIG. 6 is a perspective view of the housing of the motor and fan and the cutter guard assembly of the lawn mower of FIG. 1.

FIG. 6 illustrates the housing 105 of the motor and fan, a cutter disc 205 and cutter blades 604 and a cutter guard 603. The housing 105 is provided with a castellated section 501, providing venting slits into the housing and allowing air flow 602 to the fan and motor. A cutter guard 603 is also illustrated, which provides some protection to the user from the cutter disc and blades.

Figure 7:
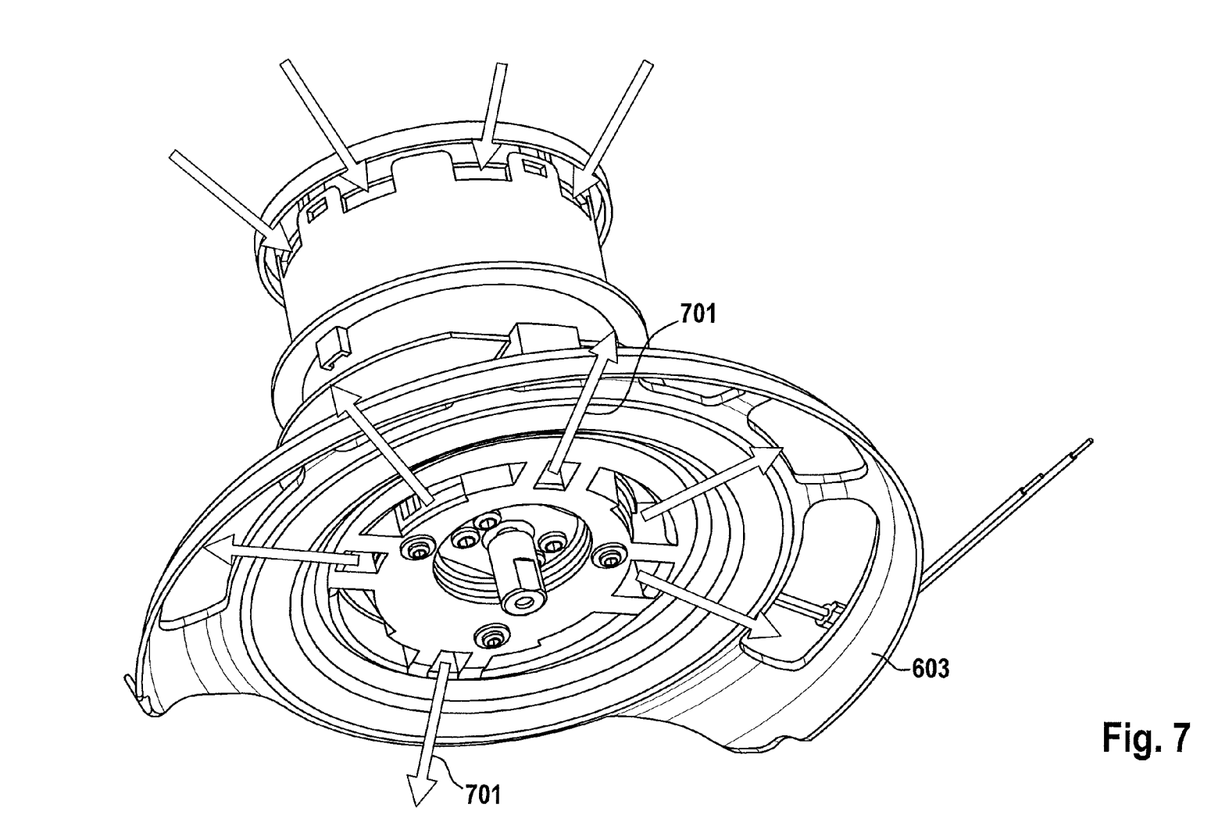
FIG. 7 is a perspective view of the lower side of the housing and cutter guard shown in FIG. 6.

FIG. 7 shows a perspective view of the lower side of the housing and cutter guard according to an embodiment of the disclosure. The exhaust airflow 701 is illustrated as it exits from the motor housing and into the cutter guard 603. The exhaust is positioned so as blow directly into the cutter guard 603, which is angled and shaped so as to channel air away from 10 the machine and to force grass cuttings back into the sward. This assists in the mulching process as well as preventing the machine from drawing in freshly cut debris.

Larger and more powerful batteries compared with existing designs may be employed as the batteries may be easily cooled even in high ambient temperatures. Protection against water ingress is also important, particularly to enable power washing of the device. The positioning and the sizing of the vents is important to provide as much waterproofing as possible.

The fan action can also be used to assist in the removal of debris from the cutting disc and blades. Robotic lawn mowers are designed to be used on a more frequent basis than ordinary mowers, possibly even on a daily basis. The cuttings from such a mower will therefore be smaller than those from a conventional mower and will be similar to those of a mulching mower. Mulching lawn mowers recycle grass clippings by finely cutting and re-cutting the grass directing cuttings into the sward to wilt and decompose, thereby feeding the soil. Recycling or mulching the grass in this way also saves time as there is no requirement to stop the mowing operation to empty a grass collector or to dispose of grass cuttings. The fan action can be used to assist in the mulching process by the downward direction of the air stream after the cooling stream has passed the motor.

What is claimed is:

1. A battery operated robotic lawn mower with an active airflow management system, said active airflow management system comprising:

at least one first air vent positioned on an underside of said mower;
at least one second air vent;
an internal housing surrounding a motor;
a fan; and
at least one cooling air channel located within said internal housing and around said motor,
wherein an air flow path is defined between the at least one first air vent and the at least one second air vent, and
wherein said at least one second air vent has a lower air flow capacity than an air flow capacity of said at least one cooling air channel such that, in operation, a greater volume of air is drawn through the first vent than the second.

2. The lawn mower as claimed in claim 1, further comprising:
an enveloping outer shell defining an insulating layer between said mower and ambient atmospheric conditions.

3. The lawn mower as claimed in claim 1, wherein, when said mower is in operation, said fan provides a downward flow of air around said motor.

4. The lawn mower as claimed in claim 1, wherein said at least one first air vent is positioned behind a cutting area of said mower.

5. The lawn mower as claimed in claim 4, further comprising:
a barrier, positioned between said cutting area and said at least one first air vent, said barrier extending downwardly from and substantially across a width of said underside.

6. The lawn mower as claimed in claim 5, wherein said barrier is substantially in contact with grass at a highest cut level.

7. The lawn mower as claimed in claim 5, wherein said barrier is substantially 50 mm deep in a direction of travel of said mower.

8. The lawn mower as claimed in claim 2, wherein said at least one second air vent is positioned in an opposing side of said mower, to enable convection cooling of the mower when said motor is not in operation.

9. The lawn mower as claimed in claim 8, wherein said at least one second air vent is positioned under said outer shell.

10. The lawn mower as claimed in claim 1, wherein:
said mower includes a battery, and
said at least one first air vent has substantially equal dimensions as said battery.

11. The lawn mower as claimed in claim 1, wherein said at least one first air vent is at least about 40 mm above a height of grass at a highest cut level.

\* \* \* \* \*